United States Patent [19]

Rehfuss

[11] Patent Number: 5,336,566

[45] Date of Patent: Aug. 9, 1994

[54] TRI-CARBAMATE-FUNCTIONAL CROSSLINKING AGENTS

[75] Inventor: John W. Rehfuss, West Bloomfield, Mich.

[73] Assignee: BASF Corporation, Southfield, Mich.

[21] Appl. No.: 56,514

[22] Filed: Apr. 30, 1993

[51] Int. Cl.$^5$ .................... C08G 8/28; C08G 18/77; C08L 61/00
[52] U.S. Cl. ........................... 428/524; 525/509; 528/73; 528/115; 560/25; 560/115
[58] Field of Search ............ 525/509; 528/73, 115; 560/25, 115; 428/524

[56] References Cited

U.S. PATENT DOCUMENTS

| | | | |
|---|---|---|---|
| 3,479,328 | 11/1969 | Nordstron | 526/312 |
| 3,674,838 | 7/1972 | Nordstrom | 560/160 |
| 4,100,143 | 7/1978 | Wolf et al. | 526/301 |
| 4,126,747 | 11/1978 | Cowherd, III et al. | 560/166 |
| 4,239,866 | 12/1980 | Reitel et al. | 525/440 |
| 4,279,833 | 7/1981 | Culbertson et al. | 558/393 |
| 4,340,497 | 7/1982 | Knopf | 252/188.3 |
| 4,543,276 | 9/1985 | Parekh | 427/388.3 |
| 4,581,430 | 4/1986 | Phan et al. | 526/246 |
| 4,758,632 | 7/1988 | Parekh et al. | 525/383 |
| 4,820,830 | 4/1989 | Blank | 560/188 |
| 4,942,215 | 7/1990 | Greco et al. | 528/114 |

FOREIGN PATENT DOCUMENTS 912563 12/1962 United Kingdom ............ 544/221
974900 11/1964 United Kingdom ............ 544/221

Primary Examiner—James J. Seidleck
Assistant Examiner—I. Zemel
Attorney, Agent, or Firm—Paul L. Marshall

[57] ABSTRACT

Compounds are described having the formula:

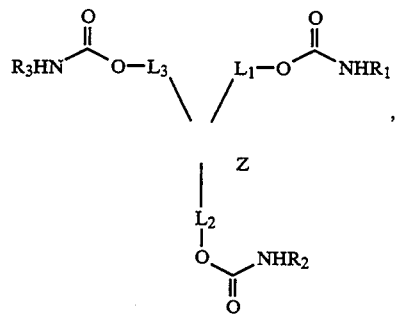

Z represents a cyanuric ring nucleus or the residue of a polyol, $L_1$, $L_2$, and $L_3$ each independently represents a divalent linking group or a covalent bond, and $R_1$, $R_2$, and $R_3$ each independently represents H, alkyl, cycloalkyl, or aryl.

These compounds are useful as crosslinking agents for curable compositions such as coating compositions.

15 Claims, No Drawings

TRI-CARBAMATE-FUNCTIONAL CROSSLINKING AGENTS

FIELD OF THE INVENTION

This invention relates to curable compositions, especially curable coating compositions, particularly acrylic compositions.

BACKGROUND OF THE INVENTION

Polyurethane compositions based on triisocyanurates for coating and/or molding are well-known in the art. They provide a number of desirable characteristics such as resistance to solvent, salt, and other types of environmental attack.

However, these polyurethanes do suffer some disadvantages. An essential building block of these polyurethanes is the triisocyanurate. Triisocyanurates are expensive and difficult to handle. The NCO groups on the triisocyanurate are highly reactive, so they must be chemically blocked if it is desired to use the triisocyanurate in a one-pack coating composition. The use of chemical blocking groups further increases the expense of the material, results in increased VOC during cure, introduces an additional component into the composition that can have the potential for adverse side-effects such as yellowing, and necessitates a high heat curing temperature on the order of 150° C. If the NCO groups are not chemically blocked, the triisocyanurate must be utilized as one part of a two-pack composition. With such a composition, the highly-reactive triisocyanurate must be kept isolated from the surrounding environment and from the other component(s) of the composition until just before application to a substrate or mold, further increasing the expense and complexity of the process.

It has thus long been desired to produce a composition that exhibits the advantages of triisocyanurate-cured compositions having an optimum mix of characteristics as described above, but without having to use isocyanates groups as the functional groups for the curing reaction.

SUMMARY OF THE INVENTION

According to the present invention, there is provided a curable composition comprising:
 (a) a component having a plurality of functional groups that are reactive with carbamate,
 (b) a component according to the formula (I):

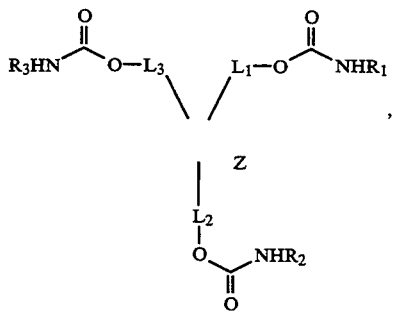

wherein
Z represents a cyanuric ring nucleus or the residue of a polyol,
$L_1$, $L_2$, and $L_3$ each independently represents a divalent linking group or a covalent bond, and
$R_1$, $R_2$, and $R_3$ each independently represents H, alkyl, cycloalkyl, or aryl.

DESCRIPTION OF THE PREFERRED EMBODIMENTS

The component (a) used in the practice of the invention has groups that are reactive with the carbamate groups on component (b). Such reactive groups include active methylol or methylalkoxy groups on aminoplast crosslinking agents or on other compounds such as phenol/formaldehyde adducts, isocyanate groups, siloxane groups, and anhydride groups. Examples of (a) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride, copolymers of maleic anhydride), and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in U.S. patent application Ser. No. 07/965,510 entitled "Carbamate-Defunctionalized Aminoplast Curing for Polymer Compositions".

The (b) component used in the practice of the invention has the formula (I):

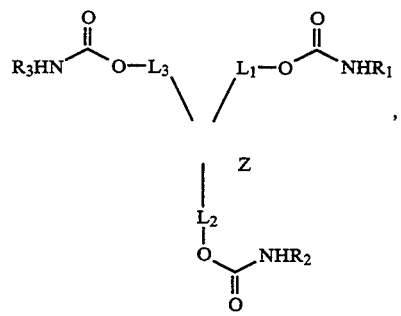

wherein
Z represents a cyanuric ring nucleus or the residue of a polyol,
$L_1$, $L_2$, and $L_3$ each independently represents a divalent linking group or a covalent bond, and
$R_1$, $R_2$, and $R_3$ each independently represents H, alkyl, cycloalkyl, or aryl.

Different synthetic schemes may be used to produce the compounds according to formula (I).

In a preferred embodiment of the invention, Z represents a cyanuric ring. Such compounds can be represented by the formula:
 (a) a component having a plurality of functional groups that are reactive with carbamate,
 (b) a component according to the formula (II):

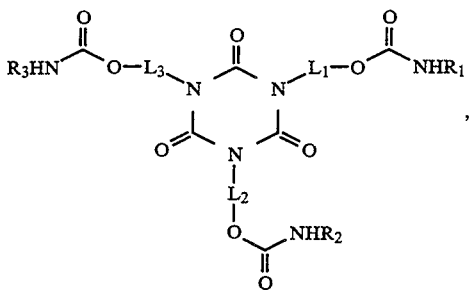

wherein

L₁, L₂, and L₃ each independently represents a linking group, and

R₁, R₂, and R₃ each independently represents H, alkyl, or cycloalkyl.

When Z represents a cyanuric ring, a diisocyanate may be first reacted with a compound containing an isocyanate-reactive group and a carbamate group (e.g., a hydroxyalkyl carbamate such as hydroxypropyl carbamate or hydroxybutyl carbamate), followed by trimerization to form an isocyanurate. Alternatively, a diisocyanate can be reacted with a compound containing an isocyanate-reactive group and a group capable of forming a carbamate group after formation of the triisocyanurate. For example, a diisocyanate can be reacted with an OH-functional cyclic carbonate (e.g., the reaction product of glycidol and $CO_2$), trimerized to form the isocyanurate, and the cyclic carbonate groups reacted with ammonia to form carbamate functional groups.

In another embodiment, an already formed triisocyanurate having multiple NCO groups may be reacted with a compound containing an isocyanate-reactive group and a carbamate group, e.g., a hydroxyalkyl carbamate such as hydroxypropyl carbamate or hydroxybutyl carbamate. Alternatively, the isocyanurate may be adducted with substituents that have the capability of forming carbamate groups after reaction with the isocyanurate compound is completed. For example, the isocyanurate can be reacted with a compound having a hydroxyl group and a cyclic carbonate group (e.g., the reaction product of glycidol and $CO_2$), and the cyclic carbonate groups then reacted with ammonia to form the carbamate functional groups.

Another method of synthesis is to react an isocyanurate having multiple non-NCO functional groups with a compound comprising at least one carbamate group and at least one group reactive with the non-NCO functional groups. Examples of non-NCO functional groups include carboxyl, epoxy, hydroxyl, amino. For example, an OH-functional triisocyanurate (which can be formed by reacting a trimerized diisocyanate isocyanurate with an excess of diol to control the amount of crosslinking or by reaction of cyanuric acid with ethylene oxide) can be reacted with methylol acrylamide (OH—$CH_2$—NH—CO—CH=$CH_2$), and the unsaturation sites then reacted with peroxide to form epoxy groups. The epoxy groups are then reacted with $CO_2$ to form cyclic carbonate groups, which are converted to carbamate groups by reaction with ammonia. Alternatively, an acid-functional triisocyanurate (which can be formed by reaction of a trimerized diisocyanate with a hydroxyfunctional carboxylic acid or by reaction of cyanuric acid with ethylene oxide followed by reaction with methylhexahydrophthalic anhydride) can be reacted with acetic anhydride to generate an anhydride-functional triisocyanurate, which can then be reacted with an hydroxycarbamate. Isocyanurate or cyanuric ring compounds having non-NCO functional groups are described in U.S. patent application Ser. No. 07/937,612, the disclosure of which is incorporated herein by reference.

The above-described diisocyanates, NCO-functional isocyanurates, non-NCO-functional isocyanurates, and cyanuric ring compounds are adducted with compounds containing a carbamate group or group that can be converted to carbamate and a group that is reactive with the NCO- or non-NCO-functional group. Carbamate-containing compounds that can be adducted onto the NCO groups of a diisocyanate or an isocyanurate are preferably hydroxyalkyl carbamates such as hydroxypropyl carbamate or hydroxybutyl carbamate. Compounds containing groups that can be converted to carbamate and groups that are reactive with NCO include hydroxy-containing cyclic carbonate compounds convertible to carbamate by reaction with ammonia (e.g., the reaction product of glycidol and $CO_2$), monoglycidyl ethers (e.g., Cardura E ®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia.

The composition of the divalent linking group L₁, L₂, and L₃ in the above formula may be controlled by the type of cyanuric ring compound or polyisocyanate chosen. The divalent linking groups L₁, L₂, and L₃ individually may be either an aliphatic (e.g., hexamethylene), cycloaliphatic (e.g., residue of isophorone diisocyanate or

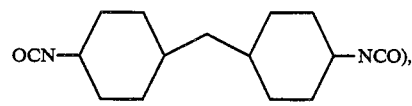

or aromatic group (e.g., residue of tetramethylxylylene diisocyanate), preferably up to 20 carbon atoms with terminal urethane, urea, or ester bonding to the substituent comprising the carbamate group. If resistance to solar degradation is desirable, then the divalent linking groups are preferably all aliphatic or cycloaliphatic. In a preferred embodiment, each of the —L—groups independently represents a group having the formula —A—NH—COO—D—where A and D each represents a divalent linking group as described below.

In the above formulas, R₁, R₂, and R₃ each independently represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogensubstituted alkyl or cycloalkyl. In a preferred embodiment, R₁, R₂, and R₃ are H, as primary carbamates will have higher reactivity than secondary carbamates, allowing for greater flexibility in the choice of the (a) component to react with the carbamate groups during cure. Substituents that will have an adverse impact on the properties of the cured material, however, are to be avoided. For example, ether linkages are thought to be susceptible to hydrolysis, and should be avoided in locations that would place the ether linkage in the crosslink matrix.

Although isocyanurates derived from cyanuric acid are useful in the present invention, isocyanurates formed by condensation of one or more types of diisocyanates, such as hexamethylene diisocyanate, or isophorone diisocyanate are preferred. Examples of preferred isocyanurates include the isocyanurate of hexamethylene diisocyanate, and the isocyanurate of isophorone diisocyanate. If light-fastness is not a critical requirement, then an aromatic isocyanurate such as the isocyanurate of 2,4-toluene diisocyanate may be used.

In a preferred embodiment of the invention, component (b) is derived from a trimerized diisocyanate, and has the formula (III):

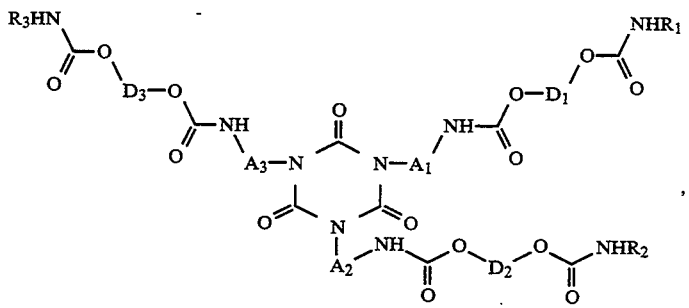

wherein
$A_1$, $A_2$, and $A_3$ each independently represents a divalent linking group, and
$D_1$, $D_2$, and $D_3$ each independently represents a divalent linking group.

In this formula, each A is a divalent linking group as is typically derived from the core of the diisocyanate used to form the isocyanurate, and may be either an aliphatic (e.g., hexamethylene), cycloaliphatic (e.g., residue of isophorone diisocyanate or

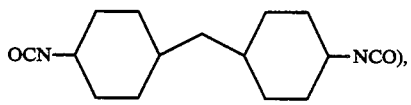

or aromatic group (e.g., residue of tetramethylxylylene diisocyanate), preferably up to 20 carbon atoms. Each D is a divalent linking group, preferably up to 20 carbon atoms, and is typically derived from the compounds having a carbamate group or carbamate-convertible group as described above.

In an alternative embodiment of the invention, Z is the residue of a polyol, preferably a triol such as trimethylol propane (TMP) or glycerine.

Compounds of this type can be prepared by reacting the polyol with a diisocyanate such as hexamethylene diisocyanate or isophorone diisocyanate to form a trifunctional NCO adduct, as is well-known in the field of electrodeposition coating compositions. Any of the techniques described relating to tri-NCO functional isocyanurate trimers of diisocyanates can be utilized to prepare the tri-functional carbamate compound. For such compounds, $L_1$, $L_2$, and $L_3$ in formula (I) above would be a linking group, such as the —A—CO2—N-H—D—groups shown in formula (III), derived from diisocyanate used in the preparation of the tri-functional NCO adduct and the compound containing the carbamate group. For example, a tri-functional NCO adduct of TMP and hexamethylene diisocyanate can be reacted with a hydroxy carbamate such as hydroxypropyl carbamate to form the trifunctional carbamate compound.

Alternatively, if a secondary carbamate is to be formed where, according to formula (I), $R_1$, $R_2$, and $R_3$ are not hydrogen, the polyol can be reacted with a mono-isocyanate compound, such as butyl isocyanate. In such a case, $L_1$, $L_2$, and $L_3$ will represent a covalent bond.

The compound according to formulas (I), (II), and (II) preferably has a molecular weight of 300 to 3000, preferably 450 to 1800. The equivalent weight per carbamate functional group can range from 100 to 1000, and preferably 150 to 600.

A solvent may optionally be utilized in the coating composition used according to the present invention. Although the formulation of the present invention may be utilized, for example, in the form of substantially solid powder, or a dispersion, it is often desirable that the formulation used in the present invention is in a substantially liquid state, which can be accomplished with the use of a solvent. Preferably the solvent is present in an amount effective to substantially solubilize both the (a) component and the (b) component. In general, the solvent can be any organic solvent and/or water. More preferably, the solvent is a polar aliphatic solvents or polar aromatic solvents. Still more preferably, the solvent is a ketone, ester, acetate, aprotic amide, aprotic sulfoxide, aprotic amine, and water. Examples of useful solvents include methyl ethyl ketone, methyl isobutyl ketone, m-amyl acetate, ethylene glycol butyl ether-acetate, propylene glycol monomethyl ether acetate, xylene, n-methylpyrrolidone, and blends of aromatic hydrocarbons.

The solvent may be present in the coating composition in an amount of from about 0.01 weight percent to about 99 weight percent, preferably from about 10 weight percent to about 60 weight percent, and more preferably from about 30 weight percent to about 50 weight percent.

The above-described coating compositions can be coated on the article by any of a number of techniques well-known in the art. These include, for example, spray coating, dip coating, roll coating, curtain coating, and the like. For automotive body panels, spray coating is preferred.

In one preferred embodiment, the composition of the invention is used as the clear coating composition over a pigmented basecoat as part of a composite color-plus-clear coating. Such composite coatings are popular for their depth of color and liquid glossy surface appearance. They have found particularly wide acceptance in the field of automotive coatings.

Pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

After the article is coated with the above-described layers according to the invention, the coated article is subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 82° C. and 144° C., and are preferably between 110° C. and 133° C. The curing time will vary depending on the blocking agents, and physical parameters such as the thickness of the layers, however, typical curing times range from 15 to 60 minutes.

The invention is further described in the following examples.

EXAMPLE 1

Triisocyanuate having carbamate functional group

A reactor vessel under a nitrogen blanket was charged with 1047.0 g of T1890 (the isocyanurate of isophorone diisocyanate, available from Hulls America, Inc., Piscataway, NY), 4.2 g of dibutyltin dilaurate, and 356.7 g of the solvent propylene glycol monomethyl-ether acetate. Temperature control was applied to the reaction mixture until a constant temperature of about 80° C. was reached, and 381.1 g of hydroxypropyl carbamate was slowly added. The reaction was maintained until virtually all of the NCO had been consumed. At that point, additional solvent (337.8 g propylene glycol monomethylether acetate and 25.0 g n-butanol) was added to the mixture.

EXAMPLE 2

Coating Example

A clear coating composition was prepared having the following formulation:

| Ingredient | Parts by weight |
| --- | --- |
| Example 1 | 56.70 |
| Dispersion of partially-defunctionalized melamine formaldehyde resin* in xylene (51.9% non-volatiles) | 14.19 |
| Tinuvin 348B ® | 6.84 |
| Tinuvin 123 ® | 0.42 |
| Dispersion of dodecylbenzene sulfonic acid (33.0% non-volatiles) | 0.84 |
| solvent blend (Exxate 800 ® and butanol) | 26.61 |

*A melamine formaldehyde resin as described in U.S. Pat. application Ser. No. 07/965,510 where three of the reactive sites have been made non-reactive with the carbamate-functional groups of the isocyanurate by adducting carbamate groups onto the melamine. This compound has the formula:

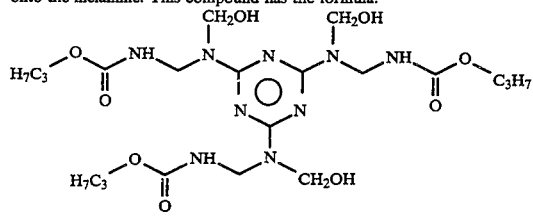

This composition was then applied onto a metal test panels that had been precoated with an unbaked high solids solvent-borne acrylic/melamine pigmented basecoat. The basecoat was applied to a primed metallic substrate test panel in two coats with a period of one minute in between coats to allow the first coat to flash

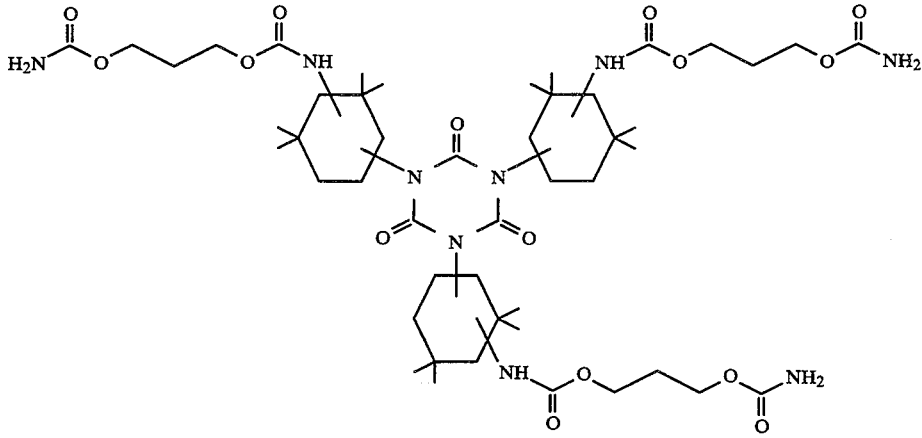

dry. After the second basecoat was applied, the basecoat was flash dried, followed by application of the clear coat composition. The clearcoat was applied in two even coats with a flash between coats. The coated substrate was then allowed to dry for a short period, and then bake cured at 140° C. for 30 minutes.

The panel was then placed on an outside exposure rack under severe etch-producing conditions for 4 weeks. The test panel coated with the coating of the invention (Example 2) had the most favorable etch rating of 1 on the General Motors etch evaluation scale. By comparison, a test panel coated with a state-of-the-art (prior art) clearcoat utilizing a hydroxy-functional acrylic polymer and an alkylated melamine-formaldehyde resin had an etch rating of 10 on the General Motors etch evaluation scale. This represents a significant advantage in the etch performance of the the coating composition according to the invention.

The invention has been described in detail with reference to preferred embodiments thereof. It should be understood, however, that variations and modifications can be made within the spirit and scope of the invention.

What is claimed is:

1. A coating composition comprising:
   (a) a component having a plurality of functional groups that are reactive with carbamate,
   (b) a component according to the formula:

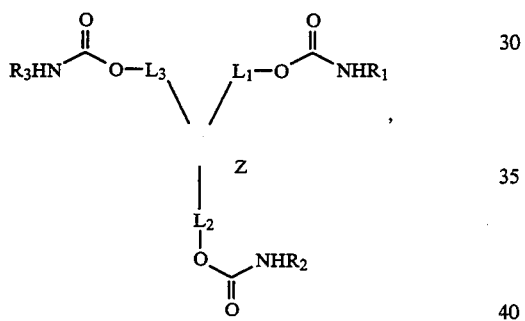

Z represents a cyanuric ring nucleus or the residue of a polyol, $L_1$, $L_2$, and $L_3$ each independently represents a divalent linking group or a covalent bond, and $R_1$, $R_2$, and $R_3$ each independently represents H, alkyl, cycloalkyl, or aryl.

2. A coating composition according to claim 1 wherein $R_1$, $R_2$, and $R_3$ each independently represents H.

3. A coating composition according to claim 1 wherein $R_1$, $R_2$, and $R_3$ each independently represents alkyl, cycloalkyl, or aryl.

4. A coating composition according to claim 1 wherein $L_1$, $L_2$, and $L_3$ each includes a urethane linkage.

5. A coating composition according to claim 1 wherein the functional groups on the component (a) are selected from the group consisting of active methylol or methylalkyoxy groups, cyclic carbonate groups, anhydride groups, and siloxane groups.

6. A coating composition according to claim 1 wherein component (a) is an aminoplast resin.

7. A coating composition according to claim 6 wherein the aminoplast resin is melamine formaldehyde or alkylated melamine formaldehyde.

8. A coating composition according to claim 1 wherein component (a) is a polymer or oligomer backbone having said carbamate-reactive functional groups appended thereto.

9. A coating composition according to claim 8 wherein said polymeric or oligomeric backbone is derived from acrylic or methacrylic monomers.

10. A coating composition according to any of claims 1–9 wherein component (b) has the formula:

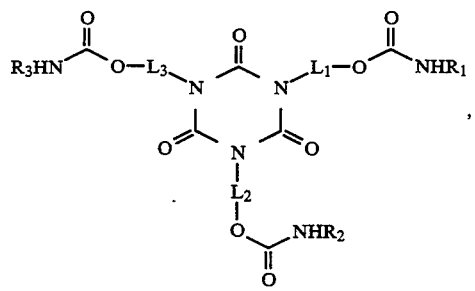

$L_1$, $L_2$, and $L_3$ each independently represents a linking group, and $R_1$, $R_2$, and $R_3$ each independently represents H, alkyl, cycloalkyl, or aryl.

11. A coating composition according to claim 10 wherein component (b) has the formula:

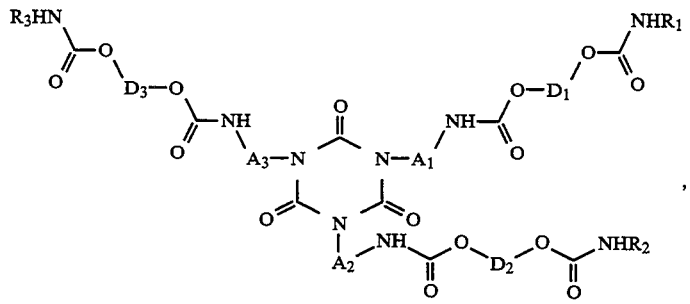

$A_1$, $A_2$, and $A_3$ each independently represents a divalent linking group, and $D_1$, $D_2$, and $D_3$ each independently represents a divalent linking group.

12. A composite color-plus-clear coating comprising a colored base coating and a clear coating, said clear coating derived from a coating composition according to claims 1, 2, or 4.

13. A composite color-plus-clear coating comprising a colored base coating and a clear coating, said clear coating derived from a coating composition comprising:

(a) a component having a plurality of functional groups that are reactive with carbamate,
(b) a component according to the formula:

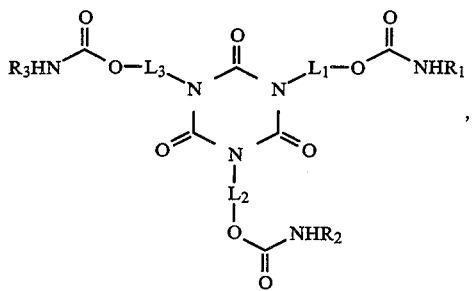

wherein
$L_1$, $L_2$, and $L_3$ each independently represents a linking group, and
$R_1$, $R_2$, and $R_3$ each independently represents H, alkyl, cycloalkyl, or aryl, 14. A composite color-plus-clear coating to claim 13 wherein the component (b) has the formula:

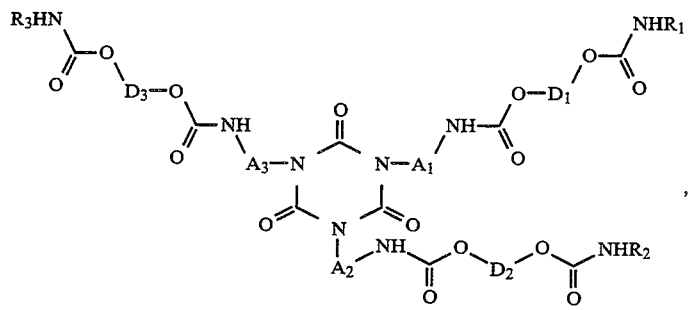

wherein
$A_1$, $A_2$, and $A_3$ each independently represents a divalent inking group, and
$D_1$, $D_2$, and $D_3$ each independently represents a divalent linking group.

15. A curable composition comprising:
(a) a component having a plurality of functional groups that are reactive with carbamate,
(b) a component according to the formula:

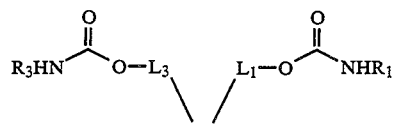
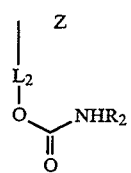

wherein
Z represents a cyanuric ring nucleus or the residue of a polyol,
$L_1$, $L_2$, and $L_3$ each independently represents a divalent linking group or a covalent bond, and
$R_1$, $R_2$, and $R_3$ each independently represents H, alkyl, cycloalkyl, or aryl.

* * * * *